(12) United States Patent
Kim

(10) Patent No.: US 6,275,526 B1
(45) Date of Patent: Aug. 14, 2001

(54) SERIAL DATA COMMUNICATION BETWEEN INTEGRATED CIRCUITS

(75) Inventor: Gwang-Myung Kim, Kyunggi-do (KR)

(73) Assignee: Samsung Electronics Ltd. (KR)

( * ) Notice: Subject to any disclaimer, the term of this patent is extended or adjusted under 35 U.S.C. 154(b) by 0 days.

(21) Appl. No.: 09/140,152

(22) Filed: Aug. 26, 1998

(30) Foreign Application Priority Data

Aug. 28, 1997 (KR) .................................................. 97-42213

(51) Int. Cl.$^7$ .................................................... H03K 7/08
(52) U.S. Cl. ............................ 375/238; 375/219; 370/276
(58) Field of Search ............................ 375/219, 22, 238; 325/38; 178/68; 370/24, 276; 359/152

(56) References Cited

U.S. PATENT DOCUMENTS

| | | | | |
|---|---|---|---|---|
| 3,922,486 | * | 11/1975 | DeJean ..................................... | 178/68 |
| 4,178,549 | * | 12/1979 | Ledenbach et al. ................ | 325/38 R |
| 5,185,765 | * | 2/1993 | Walker .................................... | 375/22 |
| 5,216,667 | * | 6/1993 | Chu et al. ............................... | 370/24 |
| 5,469,285 | * | 11/1995 | Gut ......................................... | 359/152 |
| 5,905,716 | * | 5/1999 | Vidales .................................. | 370/276 |

* cited by examiner

Primary Examiner—Stephen Chin
Assistant Examiner—Tony Al-Beshrawi
(74) Attorney, Agent, or Firm—Mills & Onello LLP

(57) ABSTRACT

Serial data is exchanged in a serial communication circuit comprising an encoder for producing a first pulse signal having a programmable pulse duration which is representative of a data value. A decoder restores the data value from the first pulse signal received from the encoder. A first data line is connected between an output terminal of the encoder and an input terminal of the decoder. A controller programs the pulse duration at the encoder based on the data value, and restores the data value at the decoder based on the first pulse signal duration. A complementary pulse signal is simultaneously transmitted with the first pulse signal on a second data line. Since the serial data transmitted has a duration-encoded single-pulse format, EMI prevention is maximized, and transmission is therefore relatively noise-free. A simple data verification and error detection is also achieved by comparing the received first data signal and complementary data signal. An acknowledge signal can optionally be sent back to the transmitter if the restored data values are equal. In this manner, erroneous transmission of data resulting from outside noise can be avoided during serial communication.

24 Claims, 8 Drawing Sheets

SERIAL DATA COMMUNICATION BETWEEN INTEGRATED CIRCUITS

BACKGROUND OF THE INVENTION

Contemporary very large scale integration (VLSI) technology commonly includes one or more communication circuits incorporated with standard logic functions in a single integrated circuit (IC) chip or functional module. Between ICs, data can be serially transmitted via a communication line using one of several conventional serial transmission techniques including: synchronous input/output (I/O) communication, UART (Universal Asynchronous Receiver/Transmitter), and I²C communication.

In synchronous I/O communication, the transmitting and receiving functions are synchronized using an auxiliary signal, for example a clock. Each function includes a controller for effecting serial transmission. At least two communication lines are required (clock and data lines), along with an auxiliary control line for enabling/disabling the communication circuit.

UART technology is designed to operate in both transmit and receive directions. Eight data lines operate as a parallel interface for internal logic, and a fully-structured serial interface is provided for a serial communication line. The UART further includes a control block for enabling serial transmission.

The UART transmission technique suffers from relatively limited signal transmission speed. Furthermore, when the control block is incorporated in an IC module, it occupies a relatively large portion of the IC circuit area, and further generates electromagnetic interference (EMI) noise resulting from rapid toggling of data and clock signals. During serial communication, a parity bit is commonly inserted into a serial data frame as a data integrity check, and a complementary data signal may be transmitted with the original data to effect transmission verification at the receiver. Such verification techniques generally require a complicated circuit configuration in the communication circuit and signal transmission system.

SUMMARY OF THE INVENTION

The present invention is directed to an apparatus and method for serial data transmission between communication circuits of IC functional modules in a manner which overcomes the limitations of the prior art.

It is an object of the present invention to provide a communication circuit adapted for reducing EMI radiation when data is transmitted serially over a communication line.

It is another object of the invention to provide a communication circuit of relatively simple construction and relatively small chip occupation area.

It is a further object of the invention to provide a communication circuit which has a simple data verification protocol.

In accordance with the above objects, the present invention is directed to a serial communication circuit including an encoder for producing a first pulse signal having a programmable pulse duration which is representative of a data value. A decoder restores the data value from the first pulse signal received from the encoder. A data line is coupled between an output terminal of the encoder and a data input terminal of the decoder. A controller programs the pulse duration at the encoder based on the data value, and restores the data value at the decoder based on the first pulse signal duration.

According to a preferred embodiment of the invention, the duration of the pulse signal comprises an initial pulse having a predetermined time duration and a data pulse comprising a summation of unit time intervals, each unit time representing a data value.

The initial pulse duration corresponds to a representation of the start of the data pulse. The time interval of the initial pulse may be shorter than, equal to, or longer than the unit time interval of the data pulse.

A complementary pulse signal may also be generated at the encoder which is the complement of the first pulse signal. The complementary pulse signal is transmitted simultaneously with the first pulse signal on a complementary data line. Both signals are received at the decoder and restored to their data values. If the data values are equal, an acknowledge signal is transmitted to the encoder to indicate that the data has been properly received. If they are not equal, the data is resent.

According to this invention, since the serial data transmitted via the data line has a single pulse format (i.e., the data values are encoded in time duration, rather than voltage), EMI is effectively prevented. Also, electromagnetic radiation is considerably reduced as compared with radiation occurring during conventional synchronous communication using clock signals or during the UART communication. Thus, communications circuitries or modules adopting this data transmission technique can be relatively free of noise problems.

Further, as the transmitter and receiver of the invention can be formed of relatively small constitutional elements, the communication circuitry may occupy a relatively small portion of the chip surface area when it is integrated into an IC module.

In addition, according to this invention, a simple data verification and error detection for the transmitted data is possible since the first pulse data signal and its complementary pulse signal are received simultaneously by the receiver and an acknowledge signal is sent back to the transmitter when the two restored data pulses have the same value. Thus, erroneous transmission of data resulting from outside noise can be avoided during serial communication.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
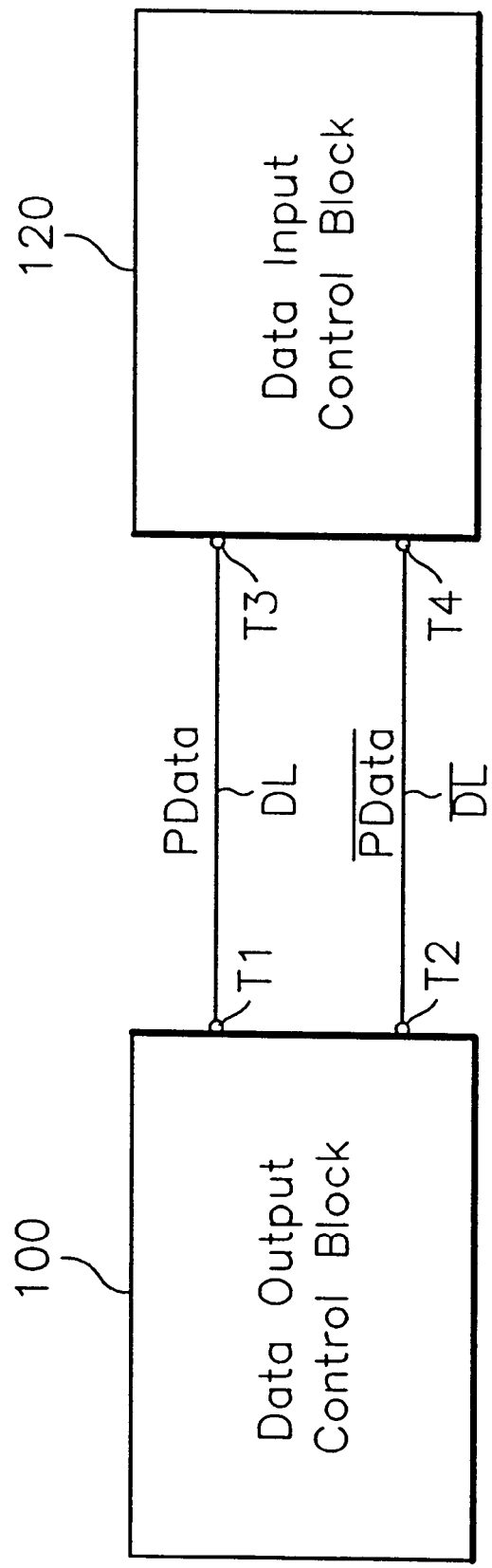
FIG. 1 is a schematic block diagram of a data transmitter and receiver which perform serial communications over dual transmission lines in accordance with the present invention.

FIG. 1 is a schematic block diagram of a data transmitter and receiver which perform serial communications over dual transmission lines in accordance with the present invention. Data transmitter 100, which may be incorporated into an IC module such as a microcontroller used in electronic home appliances, includes a data output control block. Data receiver 120, which likewise may be incorporated into an IC module such as a microcontroller, includes a data input control block. The data transmitter 100 includes two data output terminals T1, T2, and the data receiver 120 includes two data input terminals T3, T4. Data transfer terminals T1 and T3 are connected by data line DL, and terminals T2 and T4 are connected by data line $\overline{DL}$. Data line DL transfers a pulse data signal PData generated by the transmitter 100, while data line $\overline{DL}$ transfers a complementary pulse data signal $\overline{PData}$. Serial communication is performed between the data transmitter 100 and data receiver 120 in accordance with the inventive technique described below. Although the data transmitter 100 and data receiver 120 are illustrated as individual entities for describing the invention, they may be incorporated into integrated circuits (ICs) to constitute communications circuitry.

Figure 2:
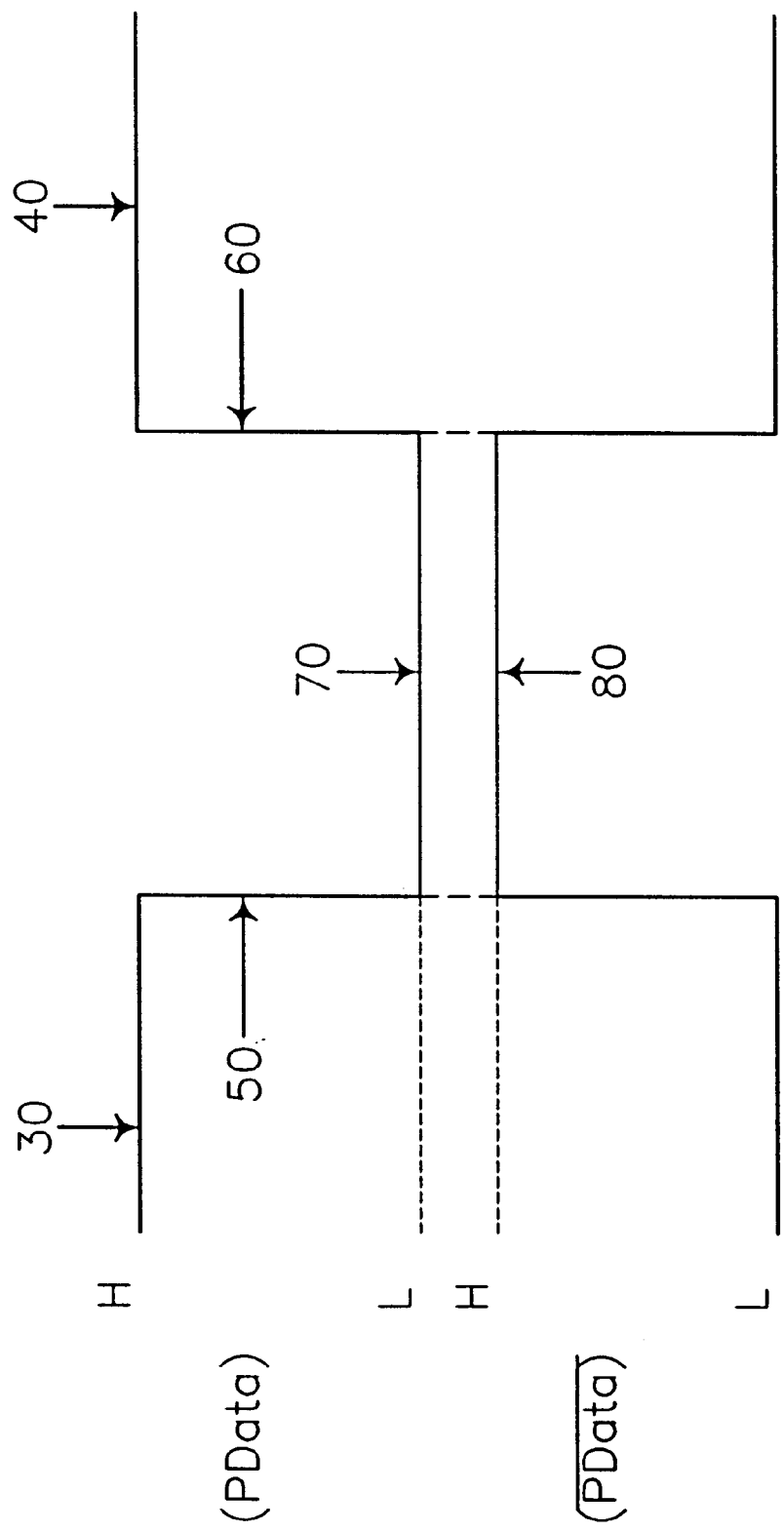
FIG. 2 is a waveform of pulse data signals of complementary relationship transmitted over dual transmission lines in accordance with the invention.

FIG. 2 shows an example of the pulse data signals PData and $\overline{PData}$ as transmitted over transmission lines DL and $\overline{DL}$, respectively. As shown, the first pulse data signal PData transmitted over the first transmission line DL toggles between a high logic level when data is not being transmitted and a low logic level when data is transmitted. High level portions 30 and 40 of the PData waveform therefore denote signal regions absent of data while the low level portion 70 denotes the data region. Further, falling edge 50 of the pulse signal PData denotes the start of the data transmission, while the rising edge 60 thereof denotes the end of data transmission.

Complementary pulse data signal $\overline{PData}$ is transmitted over transmission line $\overline{DL}$, which toggles between logical low and high levels in a complementary relationship with pulse signal. Thus, the high level portion 80 of the complementary pulse signal $\overline{PData}$ denotes the data transmission region.

Figure 3:
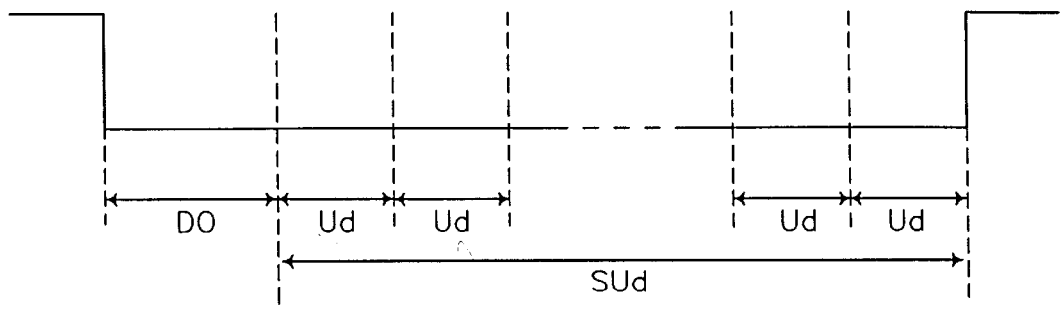
FIG. 3 is a waveform of a data format of the pulse data signal in accordance with the present invention.

Data transmitted during region 70 of the pulse signal PData has a specific format in accordance with the present invention. As shown in FIG. 3, a data pulse consists of an initial first pulse duration having a predetermined time interval DO (referred to herein as an "initial pulse") and a second pulse duration SUd of a time interval comprising a summation of unit time intervals Ud (referred to herein as a "data pulse"). Although FIG. 3 illustrates time interval DO as being longer than the unit time interval Ud, the intervals may be configured such that they have equivalent time interval or such that interval DO is shorter in duration than interval Ud.

Figure 4:
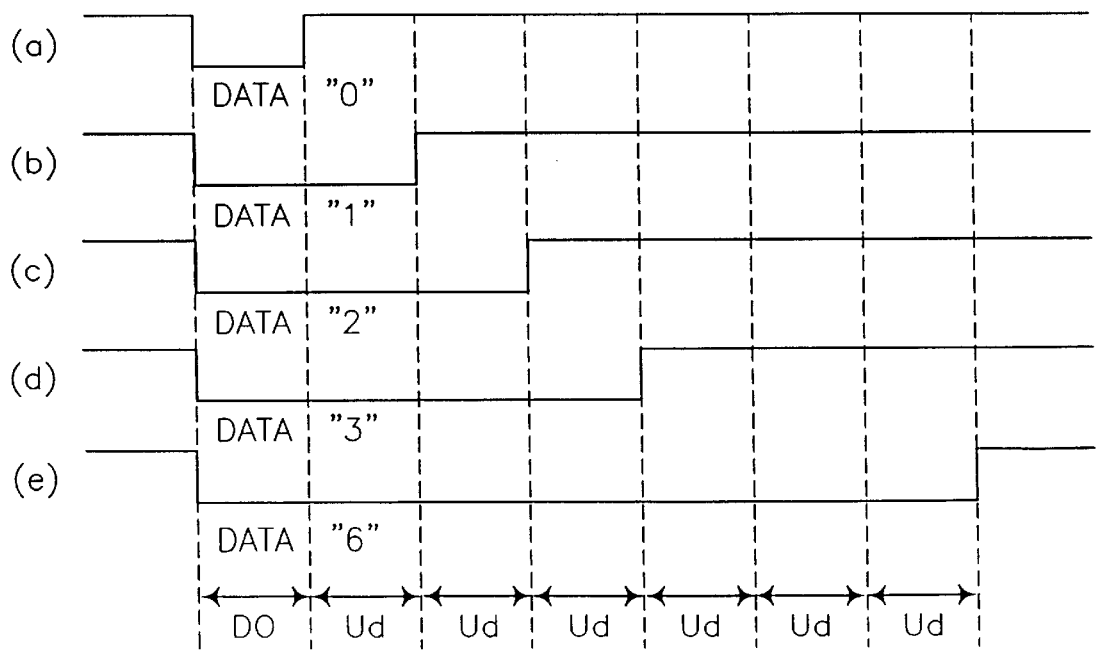
FIG. 4 is a waveform diagram of pulse data signals in which a predetermined pulse duration of each signal represents a specific data value in accordance with the present invention.

FIG. 4 illustrates several pulse data signals in which the pulse duration of each signal represents a specific data value. In FIG. 4(a), the pulse data signal has a duration of interval DO only, which may represent a data value of "0". The pulse signal of FIG. 4(b) consists of the initial pulse duration of interval DO and a data pulse duration of one unit time interval Ud, which may represent a data value of number "1". Further, as the pulse signal of FIG. 4(c) consists of the initial pulse duration interval DO and a data pulse duration having two unit time intervals 2Ud, the pulse data may represent "2". Also, as the pulse signal of FIG. 4(d) consists of the initial pulse duration interval DO and a data pulse duration having three unit time intervals 3Ud, the pulse data may represent a data value of "3". Finally, as the pulse signal of FIG. 4(e) consists of the initial pulse duration and a data pulse duration having six unit time intervals 6Ud, the pulse data may represent a data value of "6". As previously mentioned, the complementary pulse data signal $\overline{PData}$ corresponding to each of the above pulse data signals is likewise generated by the transmitter 100 and transmitted simultaneously with the Pdata signal to the receiver 120 via the second data line $\overline{DL}$.

Figure 5:
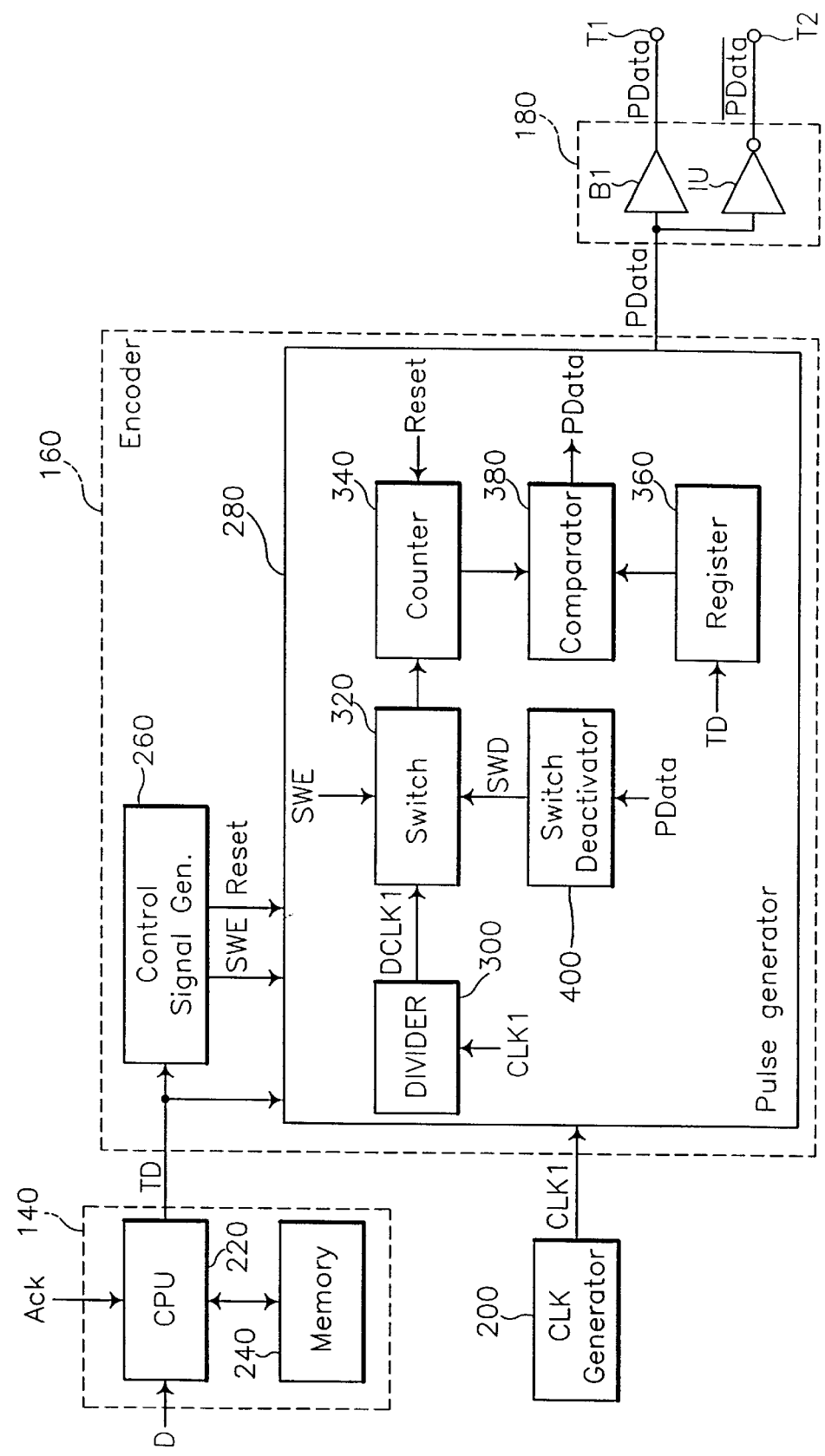
FIG. 5 is a schematic block diagram of a data transmitter in accordance with a preferred embodiment of the present invention.

A preferred embodiment of the data transmitter 100 is shown in the schematic block diagram of FIG. 5. The data transmitter 100 comprises a clock generator 200, a controller 140, an encoder 160, and a data output buffer 180. The controller 140 includes a CPU 220 and a memory 240. The encoder 160 includes a control signal generator 260, and a pulse generator 280. The pulse generator 280 includes a clock divider 300, an electronic switch 320, a counter 340, a comparator 380, a register 360, and a switch deactivator 400. The output buffer 180 of the transmitter 100 includes a buffer B1 and an inverter IU. The outputs of the buffer B1 and inverter IU constitute the output terminals T1 and T2 of the transmitter 100.

The CPU 220 is configured such that in response to a received command signal D, a pulse data signal PData as shown in FIG. 4 is generated, and further receives an acknowledgement signal ACK sent by the receiver 120 via data line DL. Memory 240 stores the CPU 220 control program.

Encoder 160 receives a clock signal CLK1 from the clock generator 200. The clock signal CLK1 is divided at the clock divider 300 to determine the time interval duration DO of the initial pulse and the unit time interval duration Ud of the data pulse SUd, which, in combination, constitute a pulse data signal. The counter 340 counts the divided clock pulses generated by the divider 300. The register 360 receives a data value TD to be transmitted and converted to a time interval of a data pulse to be added to the value of the time interval DO of the initial pulse. When data value TD is received by the register 360, counter 340 is reset to zero. At this time, CPU 220 causes the control signal generator 260 to generate a switch enable signal SWE, which is supplied to the electronic switch 320 to activate the switch.

Figure 7:
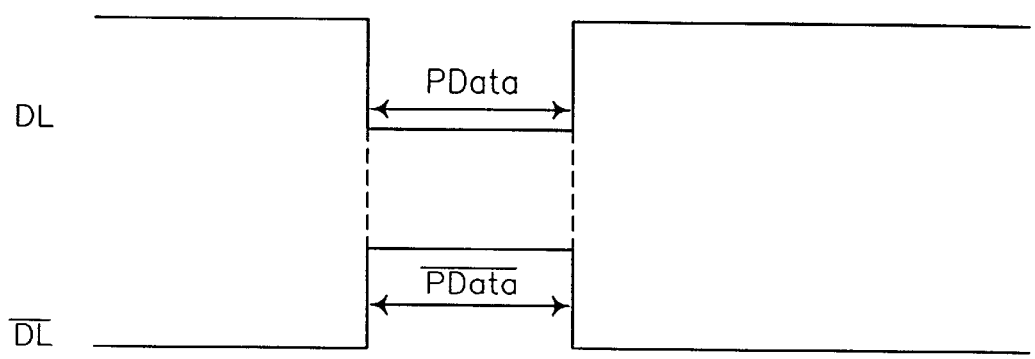
FIG. 7 is a waveform of pulse data signals transmitted from the two output terminals of the transmitter of FIG. 5.

When the switch 320 is activated, the output pulse of the divider 300 is provided to the counter 340. At the output of the counter 340, pulse signal PData is generated at a low logic level as shown in FIG. 7. The pulse signal PData is provided to output terminal T1 via buffer B1. At the same time, the complementary pulse data signal PData is generated at terminal T2 by inverter IU.

During transmission of the pulse signal PData, the comparator 380 compares the output value of the counter 340 with that of the register 360. When they are at the same value, the comparator 380 outputs a signal to the switch deactivator 400 which, in turn, deactivates switch 320. This prevents the switch 320 from transferring the output pulse DCLK1 of the divider 300 to the counter 340, and, as a result, the low-level pulse signal PData is returned to its original high level. At this point, the transmission of a pulse signal is complete.

Figure 6:
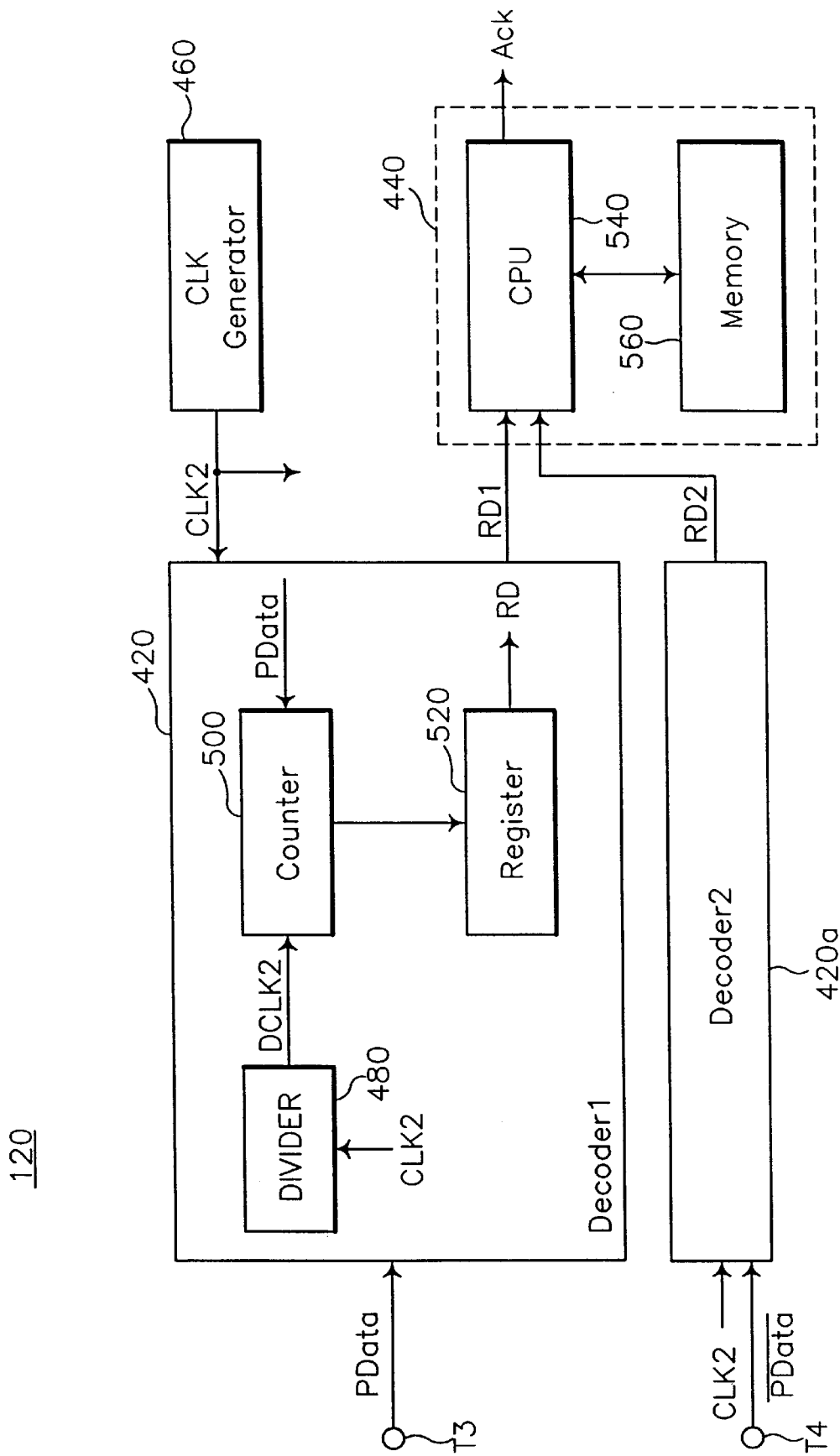
FIG. 6 is a schematic block diagram of a data receiver in accordance with the preferred embodiment of the present invention.

Referring to FIG. 6, there is shown a data receiver 120 configured in accordance with preferred embodiment of the present invention. The data receiver 120 comprises a clock generator 460, a first decoder 420, a second decoder 420a, and a controller 440. The first decoder 420 is connected to input terminal T3 to receive the pulse signal PData output from the data transmitter 100 via data line DL, and the second decoder 420a is connected to input terminal T4 to receive the complementary pulse signal $\overline{\text{PData}}$ via data line $\overline{\text{DL}}$. Each decoder 420, 420a includes a divider 480, a counter 500, and a register 520 (shown only in the first decoder 420 of FIG. 6). The controller 440 includes a CPU 540 and a memory 560 similar to those of the transmitter 100. The clock generator 460 supplies a clock signal CLK2 to the divider 480 of each decoder. The frequency of clock pulse CLK2 is preferably equal to that of the clock pulse CLK1 used in the transmitter 100.

The clock signal CLK2 is divided by the divider 480 to match the time interval DO of the initial pulse duration, and to match the unit time interval Ud of the data pulse duration SUd of the pulse data signal PData received at data line DL. The divided clock pulse DCLK2 is supplied to the counter 500 for determining the pulse duration of the received data signal. The received data signal PData is further applied to the reset input of the counter 500, to reset the counter at the falling edge of the received data signal Pdata. At the rising edge of the received data signal PData, the output value of the counter 500 is stored in register 520. The CPU 540 calculates the output value of the counter 500 and subtracts the value of the data time interval DO from the calculated output value of the counter 500. The resultant value is recognized as the received data RD1, and thus the restoration of pulse data PData is completed. The complementary pulse data signal $\overline{\text{PData}}$ is likewise restored as received data RD2 in the second decoder 420a in the same manner as described above.

The CPU 540 further compares restored data RD1 with restored data RD2. If they have the same value, then the received pulse data PData is recognized as valid. However, if the restored data RD1 and RD2 have different values, the CPU determines that the received data PData is invalid.

Figure 8:
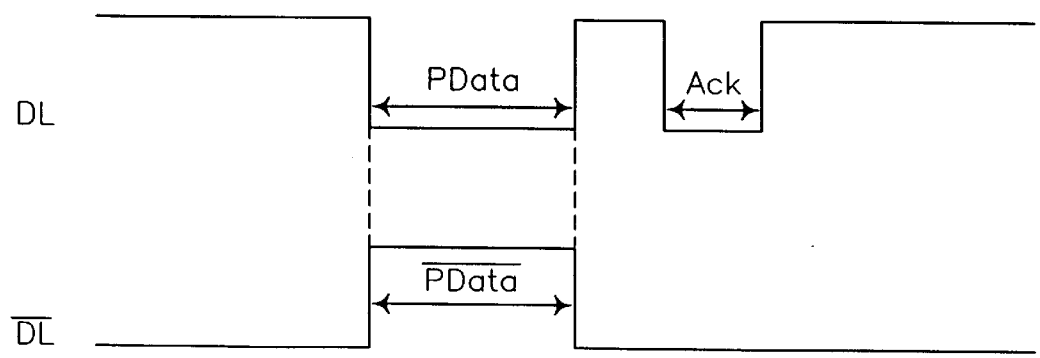
FIG. 8 is a waveform of pulse data signals as received by the receiver of FIG. 6.

If it is determined that the restored data RD1 and RD2 have the same value, for example where transmission was noise or error free, the CPU 440 may produce an acknowledge signal ACK to be sent back to the transmitter 100 via data line DL. The acknowledge signal ACK is generated as a pulse signal after a time delay following the completion of data reception as shown in FIG. 8. The time delay and duration of the acknowledge signal ACK may be set to an appropriate time value, depending on the application. When the acknowledge signal ACK is received by the transmitter 100, the transmitter CPU 220 is notified of the safe receipt of the pulse data signal PData by the receiver 120. When the acknowledge signal ACK is expected, but not received by the CPU 220, a command is issued for ordering the transmitter 100 to resend the pulse data PData.

Figure 9:
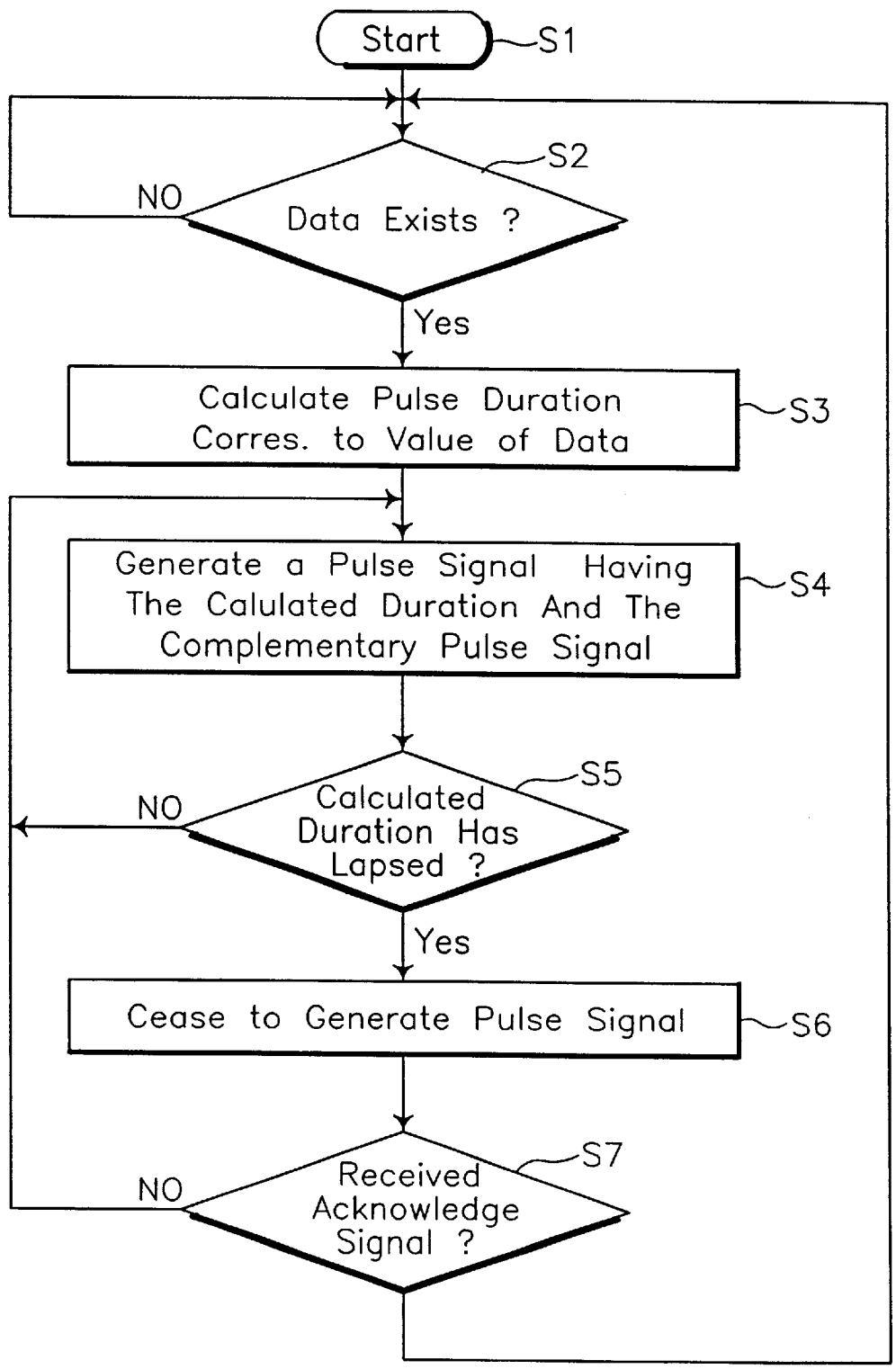
FIG. 9 is a flow diagram of the serial data transmission technique employed by the transmitter of the present invention.

FIG. 9 is a flow diagram of the serial data transmission method of the present invention. At step S2, the CPU 220 of the transmitter 100 determines whether a data to be transmitted is available in the register 360. If data is available, a calculation of the pulse duration corresponding to the data value is performed at step S3. A pulse signal Pdata (and complementary pulse signal $\overline{\text{PData}}$) having the calculated duration is generated at step S4. A determination is made at step S5 whether during generation of the pulse signal, the calculated duration has lapsed. If the calculated duration has lapsed, the counter ceases to generate the pulse signal at step S6. Finally, the CPU 220 determines whether an acknowledge signal ACK has been received from the receiver 120 at step S7. If the acknowledge signal ACK has been received, the process proceeds to step S2 to determine whether further data is available for transmission. If the acknowledge signal ACK has not been received within a predetermined time interval, the process proceeds to step S4 to regenerate the pulse signal PData and the complementary pulse signal $\overline{\text{PData}}$.

Figure 10:
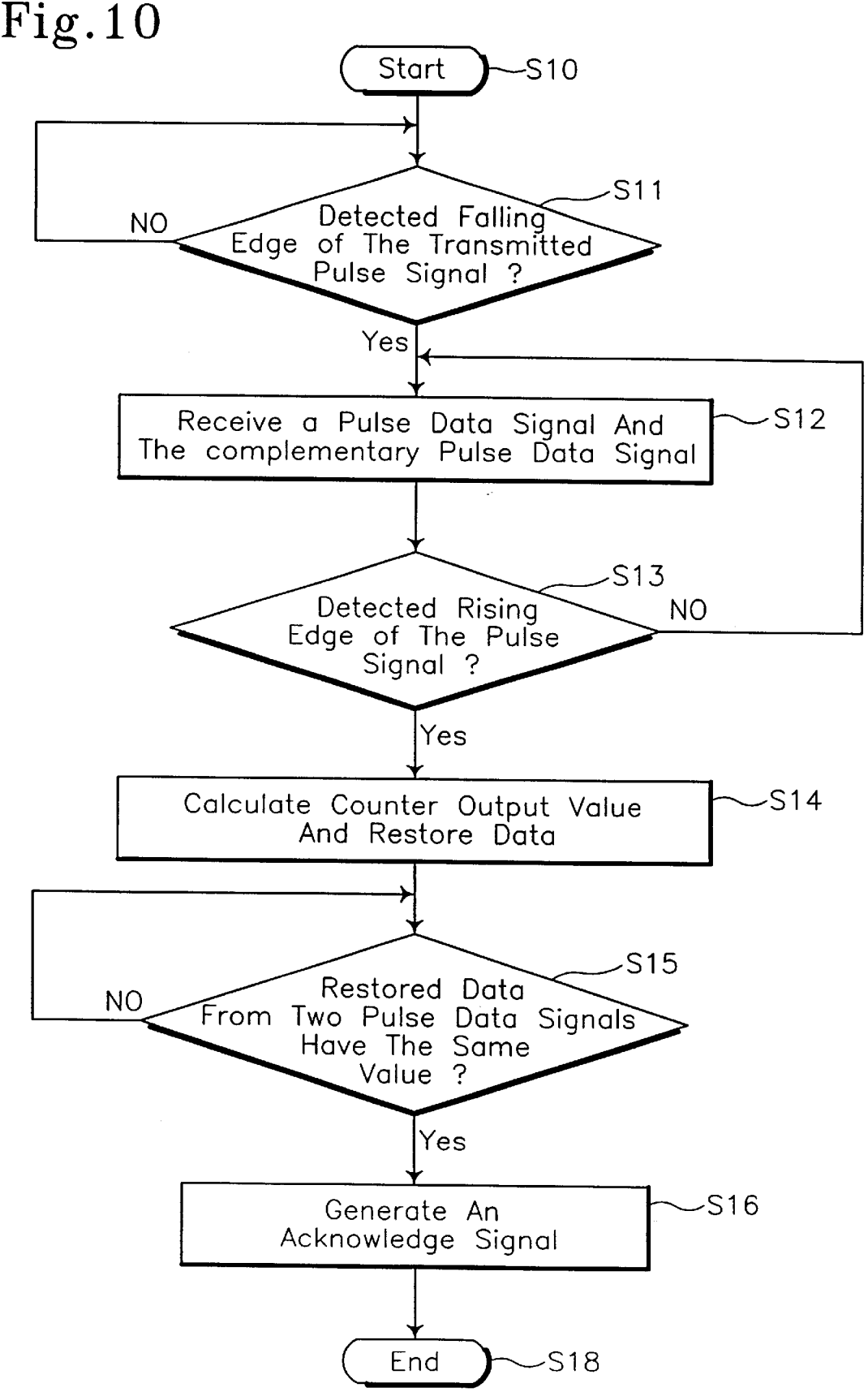
FIG. 10 is a flow diagram of the serial data reception technique employed by the receiver of the present invention.

FIG. 10 is a flow diagram of the receipt of serial data at the receiver of the present invention. The receiver 120 receives a pulse signal $\overline{\text{PData}}$ and its complementary pulse signal PData from the transmitter 100 via data lines DL and $\overline{\text{DL}}$, respectively, and restores original data by calculating the duration of the pulse signal PData. A determination is made at step S11 whether the falling edge of the pulse signal PData is detected. The pulse data signal PData and its complement $\overline{\text{PData}}$ are received at step S12. At this time, the counter 500 is reset and counting begins based on the divided clock signal output by the divider 480. During reception of these signals, a determination is made as to whether the rising edge of the pulse signal is detected at step S13. When the rising edge of the pulse signal has been detected, the counter output value corresponding to the pulse data signal PData is calculated. The counter value is stored in register 520. From the counter value, the original data RD1, corresponding to the pulse duration of the received pulse signal PData, can be obtained.

The complementary pulse signal $\overline{\text{PData}}$ is restored to a second data value RD2 using the same technique as described above. The second data value RD2 corresponds to the pulse duration of the received pulse signal $\overline{\text{PData}}$. At step S15, further determination is made as to whether the restored data values RD1 and RD2 from the two pulse data signals have the same value. If they have the same value, an acknowledge signal ACK is generated at step S16, which is sent to the transmitter via the data line DL.

As apparent from foregoing description, the data signal PData transmitted via data line DL has a single pulse format in accordance with the present invention as, throughout transmission, the signal is at a low level. This contributes to an effective EMI prevention when data is transmitted over a communication line. Electromagnetic radiation is considerably reduced as compared the radiation generated by conventional synchronous communication techniques using clock signals or UART communication. Communication circuits or modules adopting this data transmission technique can therefore have significantly reduced noise problems.

Further, since the transmitter and receiver of the present invention include a data output control block and a data input control block which are relatively simple, and therefore have small constitutional elements, the communication circuitry occupies a relatively smaller chip surface area or footprint when it is integrated into an IC module, as compared to conventional communication techniques.

In addition, according to this invention, simple data verification and error detection for the transmitted data is possible since a pulse data signal and its complement are received simultaneously by the receiver and an acknowledge signal is sent back to the transmitter if the two restored data signals have the same value. Thus, erroneous transmission of data resulting from outside noise can be avoided during serial communication.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A serial communication circuit comprising:
   a transmitter including an encoder for producing a pulse signal having a programmable pulse duration, the pulse duration being representative of a data value;
   a receiver including a decoder for restoring the data value from the pulse signal received from the encoder, the duration of the pulse signal comprising an initial pulse having a predetermined time duration interval and a data pulse comprising a summation of unit time intervals, each unit time interval representing a data value, wherein the interval of the initial pulse is longer in duration than the unit time interval of the data pulse;
   a data line connected between the transmitter and the receiver; and
   a controller for programming the pulse duration at the encoder based on the data value and for restoring the data value to the decoder based on the pulse signal duration.

2. A serial communication circuit comprising:
   a transmitter including an encoder for producing a pulse signal having a programmable pulse duration, the pulse duration being representative of a data value;
   a receiver including a decoder for restoring the data value from the pulse signal received from the encoder; the duration of the pulse signal comprising an initial pulse having a predetermined time duration interval and a data pulse comprising a summation of unit time intervals, each unit time interval representing a data value;
   a data line connected between the transmitter and the receiver;
   a controller for programming the pulse duration at the encoder based on the data value and for restoring the data value at the decoder based on the pulse signal duration; and
   wherein the decoder includes:
      a divider for dividing a clock signal into a divided clock signal which is synchronized with the unit time interval of the data pulse;
      a counter for counting, in a count value, the number of divided clock signals, wherein the counter is activated when a received pulse signal changes its level status from a first level to a second level, and is deactivated when the level status is changed from the second level to the first level; and
      a register for storing the count value when the counter is deactivated, the count value being representative of the restored data value.

3. The communication circuit of claim 1, wherein the initial pulse duration corresponds to a representation of the start of the data pulse.

4. The communication circuit of claim 1, wherein the time interval of the initial pulse is longer in duration than the unit time interval of the data pulse.

5. The communication circuit of claim 1, wherein the time interval of the initial pulse is equal in duration to that of the unit time interval of the data pulse.

6. The communication circuit of claim 1, wherein the encoder includes:
   a divider for dividing a clock signal into a divided clock signal which is synchronized with the unit time interval of the data pulse;
   means for storing the data value;
   a counter for counting, in a count value, the number of divided clock signals during transmission of the pulse signal; and
   a comparator for comparing the count value with the stored data value, wherein the comparator changes the level of the pulse signal from a first level to a second level at the outset of transmission of the pulse signal, and back to the first level when the count value and the stored data value are equal.

7. The communication circuit of claim 1, wherein the decoder includes:
   a divider for dividing a clock signal into a divided clock signal which is synchronized with the unit time interval of the data pulse;
   a counter for counting, in a count value, the number of divided clock signals, wherein the counter is activated when a received pulse signal changes its level status from a first level to a second level, and is deactivated when the level status is changed from the second level to the first level; and
   a register for storing the count value when the counter is deactivated, the count value being representative of the restored data value.

8. A serial communication circuit comprising:
   a transmitter including an encoder for producing a first pulse signal having a programmable pulse duration; the pulse duration being representative of a data value, the encoder further producing a complementary pulse signal which is a complement of the first pulse signal;
   a receiver including a decoder for restoring a first data value from the first pulse signal received from the encoder and for restoring a complementary data value from the complementary pulse signal received from the encoder;
   a first data line coupled between the transmitter and receiver for conveying the first pulse signal produced in the encoder; and
   a second data line coupled between the transmitter and receiver for conveying the complementary pulse signal produced in the encoder.

9. The communication circuit of claim 8 further comprising a controller for programming the pulse duration of the first pulse signal and complementary pulse signal at the encoder based on the data value and for restoring the data value at the decoder based on the pulse signal duration of the first pulse signal and the complementary pulse signal.

10. The communication circuit of claim 8, wherein the durations of the first and complementary pulse signals each comprise an initial pulse having a predetermined time duration interval and a data pulse comprising a summation of unit time intervals, each unit time interval representing a data value.

11. The communication circuit of claim 10, wherein the initial pulse duration corresponds to a representation of the start of the data pulse.

12. The communication circuit of claim 10, wherein the time interval of the initial pulse is longer in duration than the unit time interval of the data pulse.

13. The communication circuit of claim 10, wherein the time interval of the initial pulse is equal in duration to that of the unit time interval of the data pulse.

14. The communication circuit of claim 10, wherein the encoder includes:
- a divider for dividing a clock signal into a divided clock signal which is synchronized with the unit time interval of the data pulse;
- means for storing the data value;
- a counter for counting, in a count value, the number of divided clock signals during transmission of the pulse signal; and
- a comparator for comparing the count value with the stored data value, wherein the comparator changes the level of the pulse signal from a first level to a second level at the outset of transmission of the pulse signal, and back to the first level when the count value and the stored data value are equal.

15. The communication circuit of claim 10, wherein the decoder includes:
- a divider for dividing a clock signal into a divided clock signal which is synchronized with the unit time interval of the data pulse;
- a first counter for counting, in a count value, the number of divided clock signals, wherein the counter is activated when a received first pulse signal changes its level status from a first level to a second level, and is deactivated when the level status is changed from the second level to the first level; and
- a complementary counter for counting, in a complementary count value, the number of divided clock signals, wherein the complementary counter is activated when a received complementary pulse signal changes its level status from the second level to the first level, and is deactivated when the level status is changed from the first level to the second level; and
- first and complementary registers for storing the first and complementary count values when the first and complementary counters are deactivated, the count values being representative of the restored data values for the first and complementary data pulses, respectively.

16. The communication circuit of claim 15, wherein the decoder further includes a means for generating an acknowledge signal when the restored data values from the pulse signal and the complementary pulse signal have an equal value.

17. The communication circuit of claim 15, wherein the acknowledge signal is transmitted to the encoder via the first data line.

18. The communication circuit of claim 15, wherein the encoder further includes a means for detecting an acknowledge signal transmitted by the decoder.

19. A method for transmitting serial data comprising:
- generating a first pulse signal having a programmable pulse duration, the pulse duration being representative of a data value, wherein the pulse signal comprises an initial pulse having a predetermined time duration interval, and a data pulse comprising a summation of unit time intervals, each unit time interval representing a data value;
- generating a complementary pulse signal which is a complement of the first pulse signal; and
- simultaneously transmitting the first pulse signal and complementary pulse signal via a first data transmission line and a complementary data transmission line, respectively.

20. The method of claim 19, wherein generating a first pulse signal comprises:
- determining whether data is to be transmitted, and, if so, reading the data value;
- calculating the data pulse duration corresponding to data value;
- generating a first pulse signal PData having a duration including the duration of the initial pulse summed with the duration of the data pulse of unit time intervals;
- determining whether the duration of the first pulse signal has lapsed during generation of the first pulse signal; and
- if the calculated duration has lapsed, ceasing generation of the first pulse signal.

21. The method of claim 20, wherein generating a first pulse signal further comprises:
- determining whether an acknowledge signal ACK has been received from the receiver; and
- retransmitting the pulse signal PData if the acknowledge signal ACK has not been received within a preset time interval.

22. The method of claim 19, wherein generating a complementary pulse signal comprises inverting the level of the first pulse signal to produce the complementary pulse signal $\overline{\text{PData}}$.

23. The method of claim 19 further comprising:
- receiving, at a receiver coupled to the first and complementary data lines, the first pulse signal and complementary pulse signal; and
- restoring the data values of the first and complementary pulse signals, based on the duration of the respective signal.

24. The method of claim 23, wherein receiving comprises:
- at the outset of data reception, counting, at a first counter, the duration of the first data signal, and counting, at a complementary counter, the duration of the complementary data signal;
- when data reception is completed, converting the counted durations to a first data value and a complementary data value;
- determining whether the first and complementary data values are equal; and
- if the data values are equal, transmitting an acknowledge signal on the first data line.

* * * * *

UNITED STATES PATENT AND TRADEMARK OFFICE
CERTIFICATE OF CORRECTION

PATENT NO. : 6,275,526 B1
DATED : August 14, 2001
INVENTOR(S) : Gwang-Myung Kim

It is certified that error appears in the above-identified patent and that said Letters Patent is hereby corrected as shown below:

Column 7,
Line 65, delete "Claim 1" and insert -- Claim 2 --.

Column 8,
Line 1, delete "Claim 1" and insert -- Claim 2 --.

Signed and Sealed this

Twenty-eighth Day of May, 2002

*Attest:*

*Attesting Officer*

JAMES E. ROGAN
*Director of the United States Patent and Trademark Office*